Sept. 26, 1933.  L. H. THOEN  1,928,236
HARVESTER
Filed March 23, 1931  6 Sheets-Sheet 1
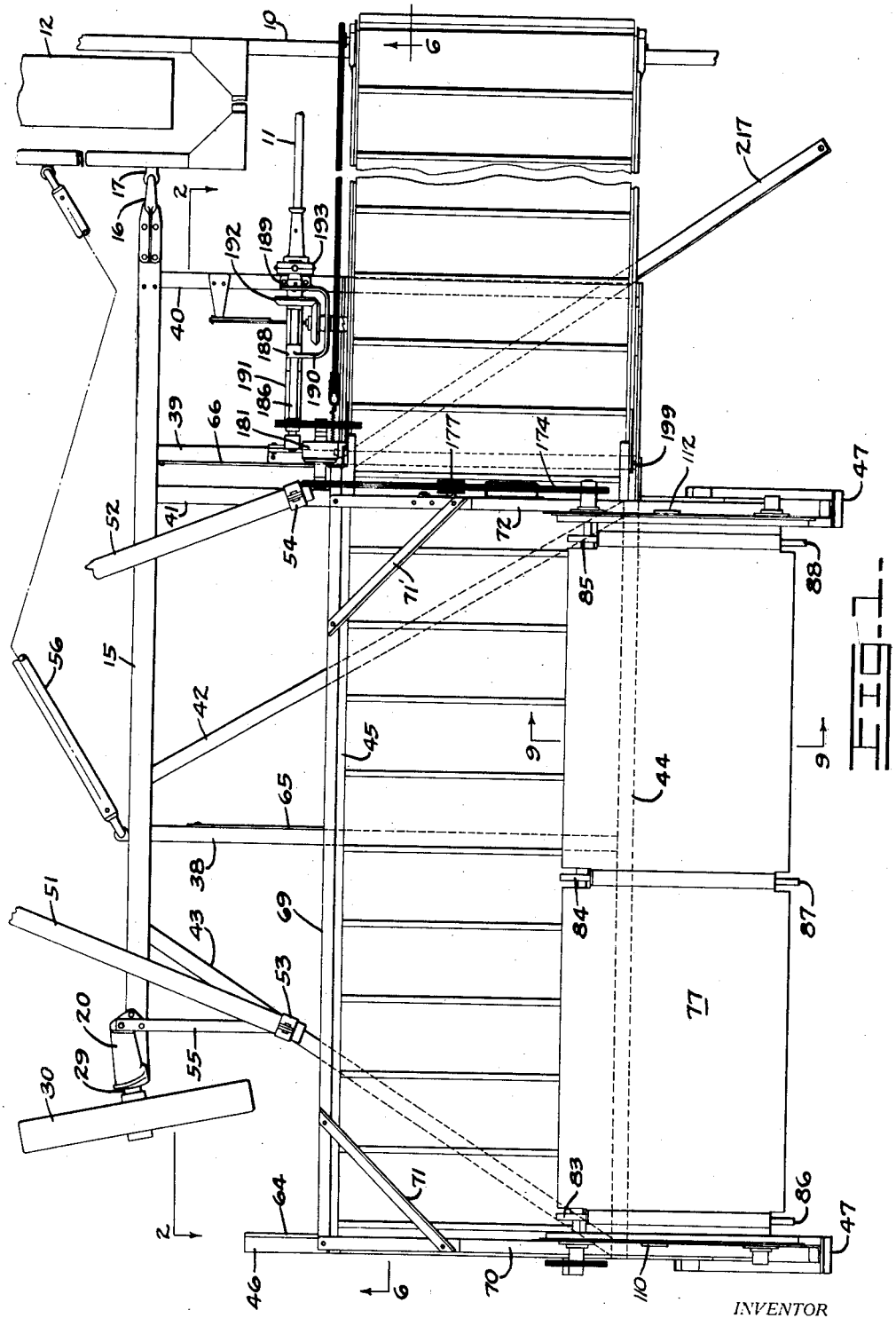
INVENTOR
LOWELL H. THOEN
BY
ATTORNEYS

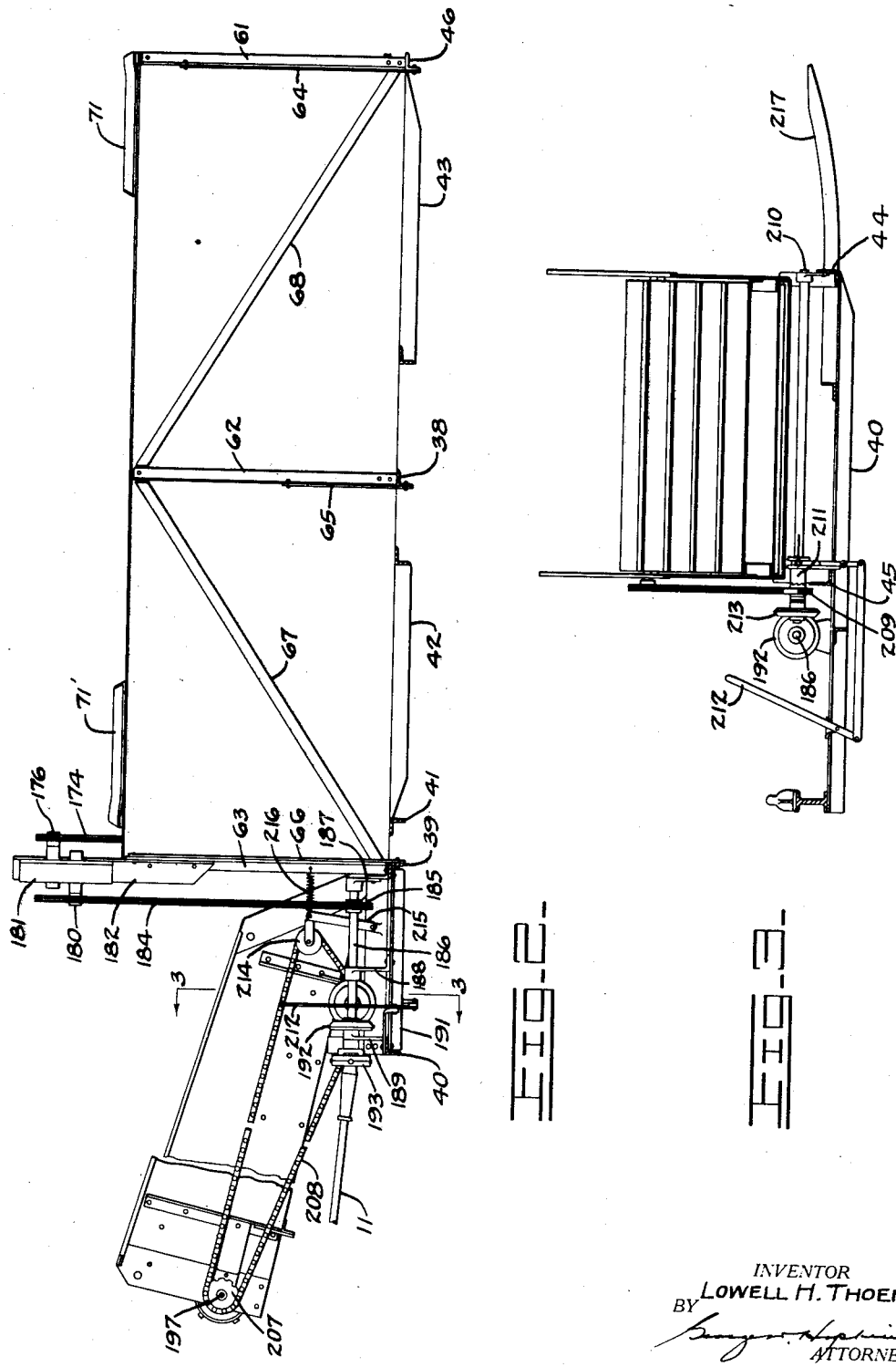

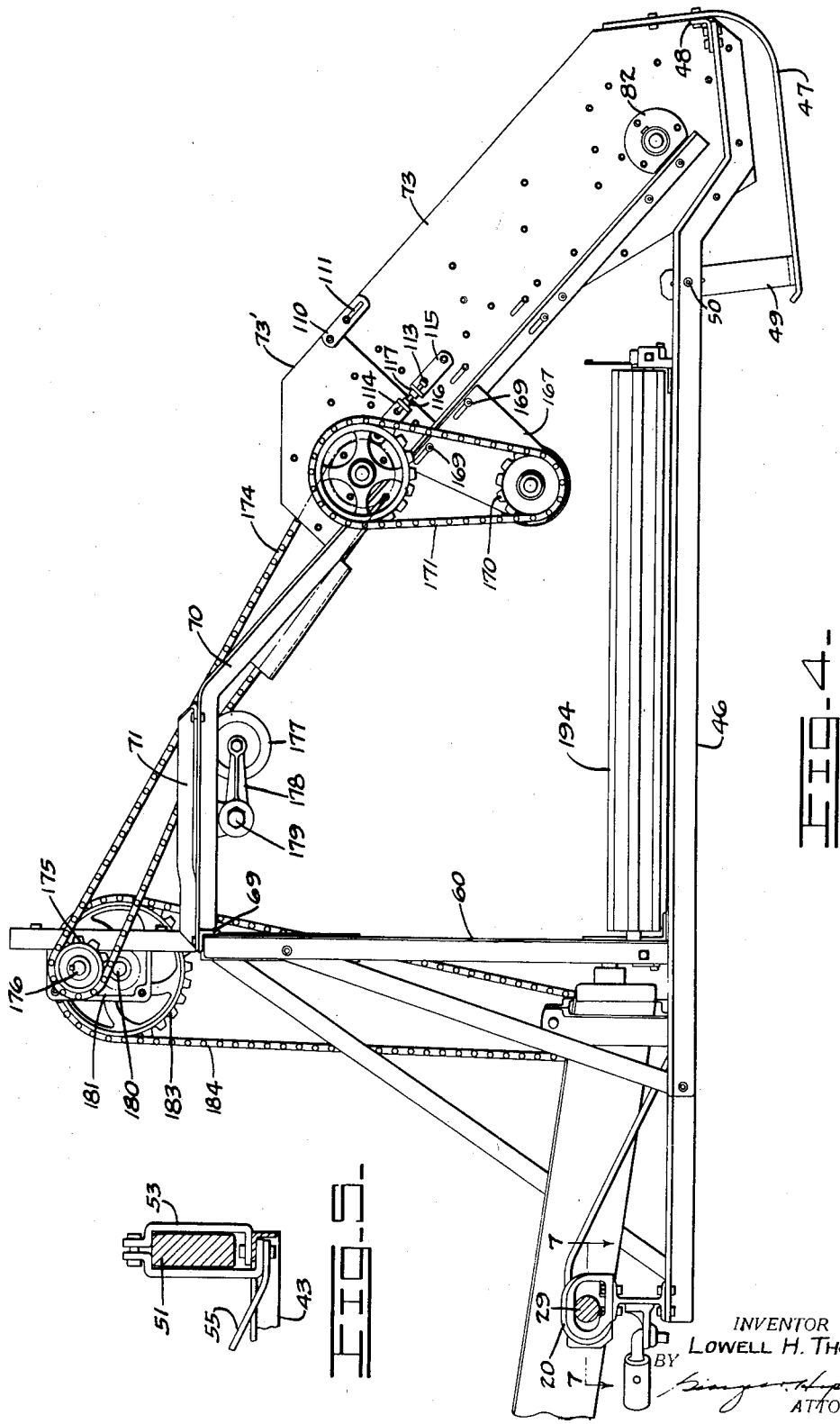

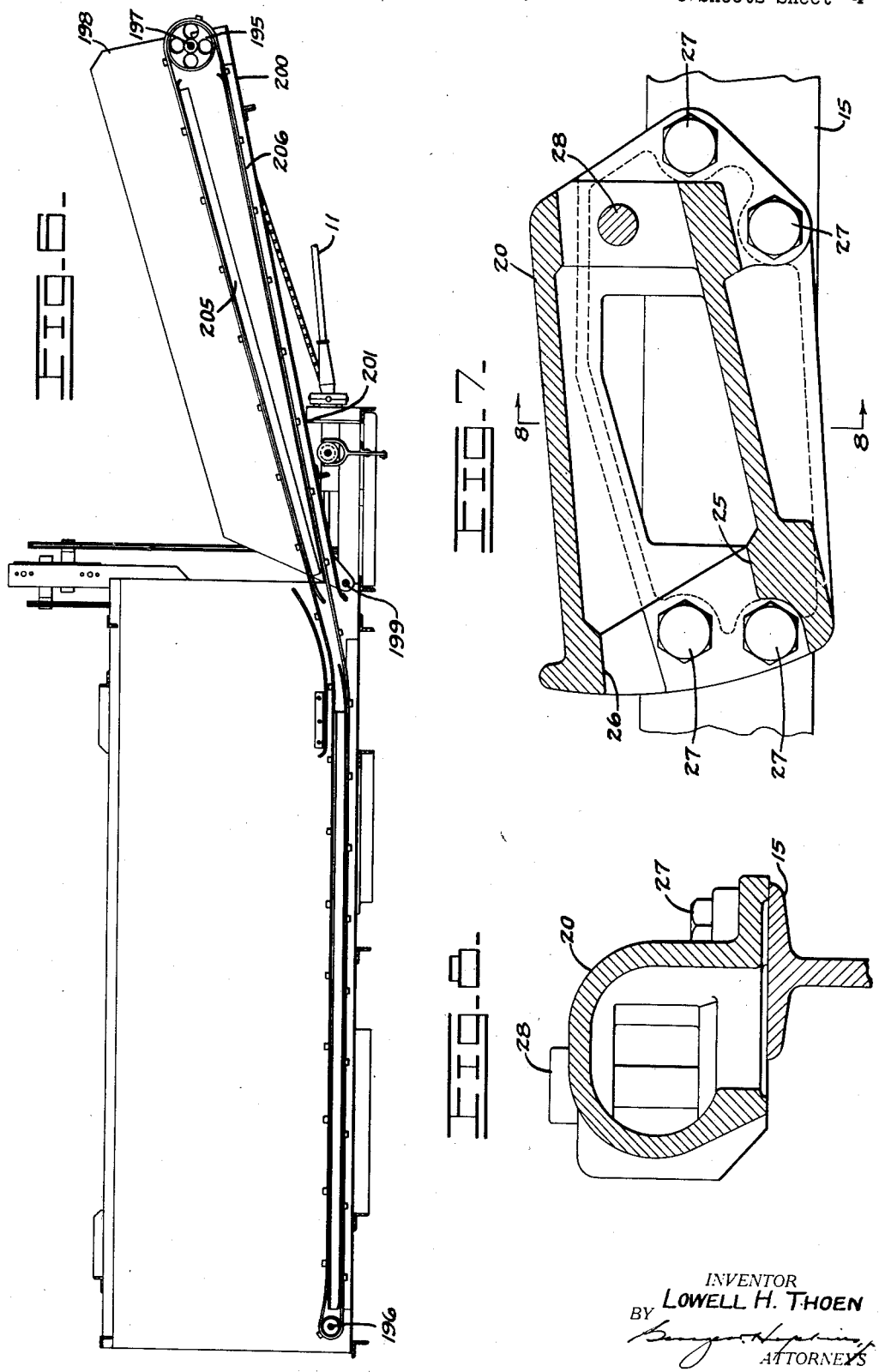

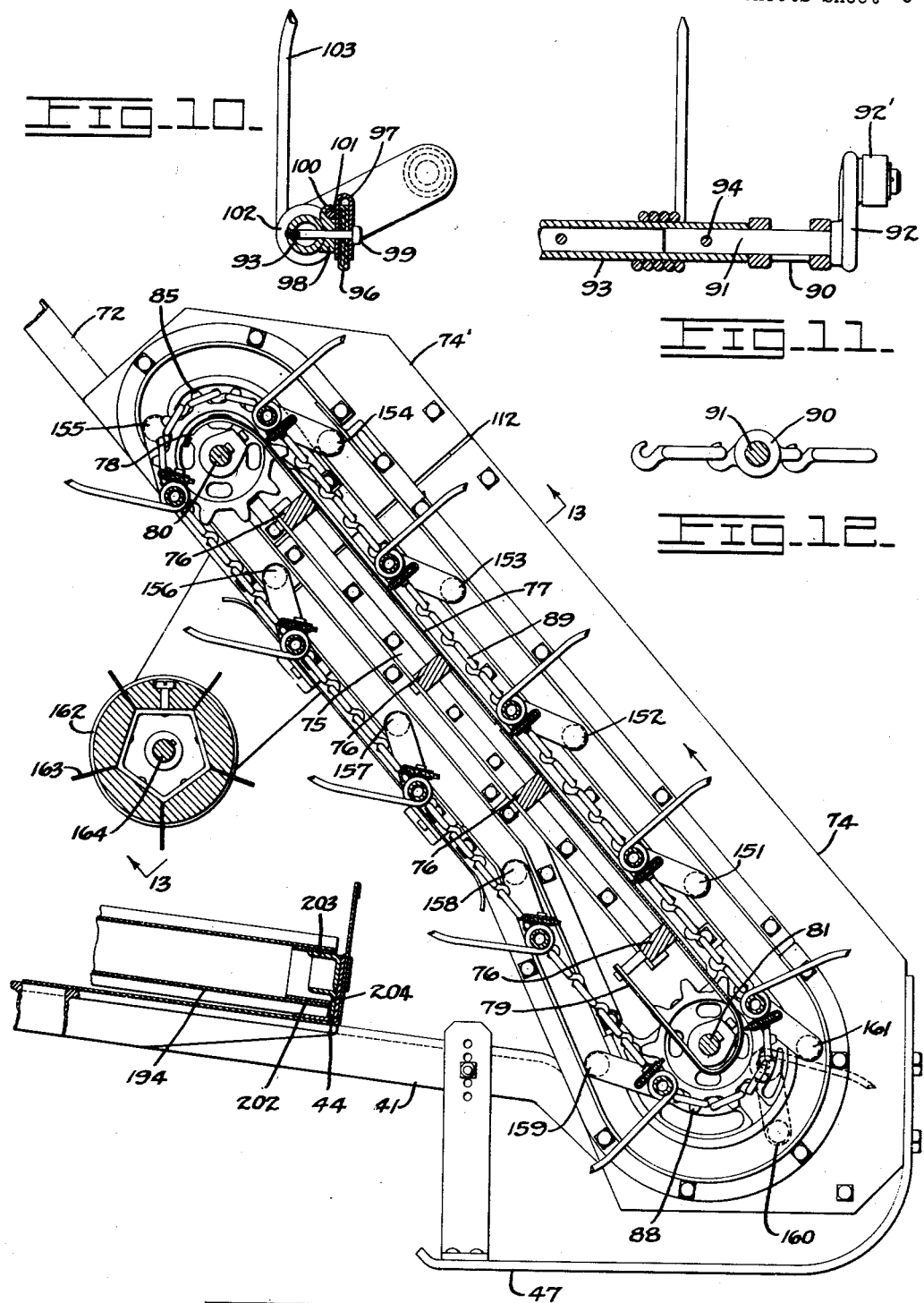

Sept. 26, 1933.　　　　L. H. THOEN　　　　1,928,236
HARVESTER
Filed March 23, 1931　　　6 Sheets-Sheet 6

INVENTOR
LOWELL H. THOEN
BY
ATTORNEYS

Patented Sept. 26, 1933

1,928,236

UNITED STATES PATENT OFFICE 1,928,236

HARVESTER

Lowell H. Thoen, San Leandro, Calif., assignor to Caterpillar Tractor Co., San Leandro, Calif., a corporation of California Application March 23, 1931. Serial No. 524,612

8 Claims. (Cl. 56—364)

Statement of invention

The object of the invention is to provide an improved pick-up unit for use in place of the usual header in a combined harvester thresher.

Description of figures

Fig. 1 is a plan view of the pick-up unit.

Fig. 2 is a rear view showing the framework and driving connections, taken on line 2—2 of Fig. 1.

Fig. 3 is a sectional view on line 3—3 of Fig. 2.

Fig. 4 is a right side elevation of the unit with the supporting wheel omitted, the stub axle therefor being shown in section.

Fig. 5 is a detailed sectional view showing the method of securing the inner end of the balance means to the framework.

Fig. 6 is a sectional view taken on line 6—6 of Fig. 1.

Fig. 7 is a sectional view on line 7—7 of Fig. 4.

Fig. 8 is a sectional view on line 8—8 of Fig. 7.

Fig. 9 is a sectional view of the pick-up mechanism taken on line 9—9 of Fig. 1.

Fig. 10 is a detailed view showing the method of attaching the tang and wiper to the tang bar.

Fig. 11 illustrates the manner in which the crank is attached to the tang bar.

Fig. 12 is a detailed view illustrating the means for connecting the tang bar to the chain.

Description of mechanism

Figure 13:
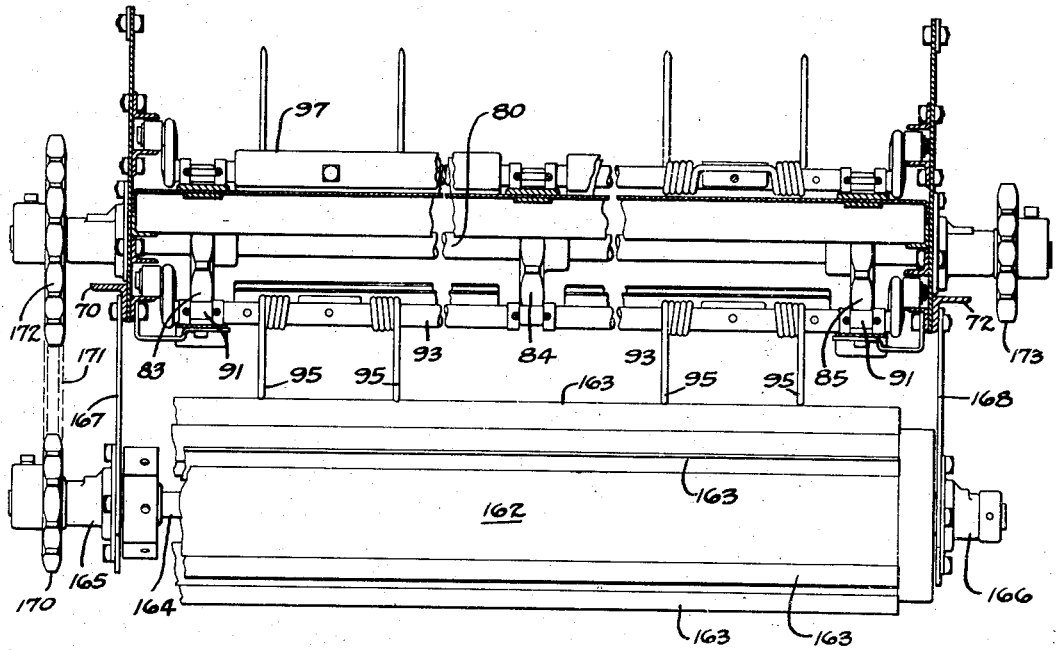
Fig. 13 is a sectional view taken on line 13—13 in Fig. 9.

The pick-up unit is adapted to be attached to and propelled by a combined harvester thresher, the main frame of which is indicated at 10 (Fig. 1), and the operating parts of the pick-up mechanism are driven from the driving means for the threshing mechanism, not shown, through shaft 11. The framework 10 which appears in Fig. 1 is on the right side of the machine, the right rear wheel of which is indicated at 12. The forward direction of movement of the machine is toward the bottom of the sheet as read in Fig. 1.

The unit is substantially balanced on beam 15 which is connected by hook 16 at its inner end to eye 17 secured to main frame 10. The outer end of beam 15 is secured to bracket 20 in which wheel 30 is supported for rotation and a limited axial oscillation to facilitate turning. Secured to beam 15 and extending forwardly therefrom and normal thereto are three bars 38, 39, 40 and a longer bar 41. Also secured to beam 15 are diagonal braces 42—43. The forward ends of bars 40 and diagonal braces 42—43, and an intermediate portion of bar 41, are secured to crossbar 44. Extending rearwardly of and parallel to crossbar 44 is crossbar 45 which is of substantially equal length, which is secured to the bars 40—41 and braces 42—43 where it crosses them. The outer ends of crossbars 44 and 45 are secured to bar 46 which, like the bar 41, extends forwardly of cross bar 45 and then downwardly, as shown in Fig. 4. Shoes 47 for contacting the ground are attached to the forward ends of bars 41 and 46. As shown in Fig. 4, shoe 47 is fastened by means of angle 48 to the flange of bar 46, and to extension 49 adjustably secured by bolt and slot connection 50 to bar 46.

A pair of converging balance beams 51—52 (Fig. 1) are joined at their outer ends to support a weight, not shown, and adjacent their inner ends rest upon the beam 15. The inner end of beam 51 is connected to diagonal brace 43 by brackets 53, and the inner end of beam 52 is similarly connected to bar 41 by bracket 54. The short brace 55 is secured at its rear end by bracket 20 and at its forward end to diagonal brace 43 as shown in Fig. 5.

The supporting framework of the unit is thus secured to the beam 15 and is substantially balanced thereon by the balance beams 51—52. Beam 15 is maintained substantially normal to the side of the machine by push pole 56. The beam is, however, free to swing in the vertical plane of its axis about the hook and eye connection 16—17. Shoes 47 at the front of the pick-up are for contact with the ground.

Wheel 30 (Fig. 1) is rotatably mounted on stub axle 29 (Fig. 4) which has a limited swinging movement about vertical pivot pin 28 (Figs. 7 and 8) which is held in bracket 20. Bracket 20 is secured to beam 15 by bolts 27. The opening in the end of bracket 20 opposite the end in which the pivot pin 28 is located is formed to limit the swinging movement of the axle about pin 28. In Fig. 7 rotation of the axle in a clockwise direction around pin 28 is limited by side wall 26, and movement in the opposite direction is limited by side wall 25.

This construction gives the wheel 30 somewhat the operation of a caster wheel so that in turning it is not necessary to skid the wheel 30 in order to turn the machine substantially about the wheel 12 on a pivot.

The backboard 60 (Fig. 4) rises vertically from the framework and is secured thereto and braced therefrom. The backboard construction comprises a sheet of metal and a supporting framework which consists of the three vertical posts, 61, 62, 63 (Fig. 2) which are secured at their lower ends to crossbar 45 and which are further supported by struts 64, 65, 66 which are connected at their upper ends to posts 61, 62, 63, respectively, and at their lower ends to bars 46, 38 and 39, respectively. The backboard is stiffened by the diagonal pieces 67, 68, and the top crossbar 69 is connected to the upper ends of the posts 61, 62, 63. A forwardly and downwardly extending bar 70 (Fig. 4) is secured to the outer end of top crossbar 69, its lower end terminating adjacent downward bend in bar 46. Bar 70 is braced from top bar 69 by member 71 (Fig. 1). Similarly arranged adjacent the inner end of top bar 69 is a forwardly and downwardly extending bar 72 which is braced by member 71'.

The pick-up mechanism is supported on bars 41, 46, 70 and 72, and for this purpose, side plates 73, 74 are provided. As shown in Fig. 4, side plate 73 is bolted to the bars 70 and 46. Side plate 74 is similarly connected to bars 72 and 41 (Fig. 9). Angle bar 75 is secured to the inner side of side plate 74, and a similar angle bar is secured to the inner side of side plate 73. These angle bars support cross members 76 to which the centerboard 77 is fastened. Centerboard 77 is preferably a sheet of metal acting as a smooth floor and extending from one side plate to the other. The upper edge of the centerboard is curved, as shown at 78, and the lower edge is bent back and secured to the lowermost cross member 76, as shown at 79.

Within the curved ends of the centerboard are shafts 80, 81, which are journaled in the side plates 73, 74 with the aid of plates such as indicated at 82 in Fig. 4. At each end, and at the center of shafts 80 and 81 (Figs. 1 and 9) are sprockets 83, 84, 85, 86, 87, 88, the sprockets on shaft 80 being keyed thereto. An endless chain 89 passes over sprockets 85, 88, as shown in Fig. 9. Sprockets 83 and 84 are connected to sprockets 86 and 87, respectively, by chains in a similar manner. As shown in Fig. 1, centerboard 77 is notched to permit the teeth of the sprocket wheels to project above the surface of the centerboard (see Fig. 9).

Figure 14:
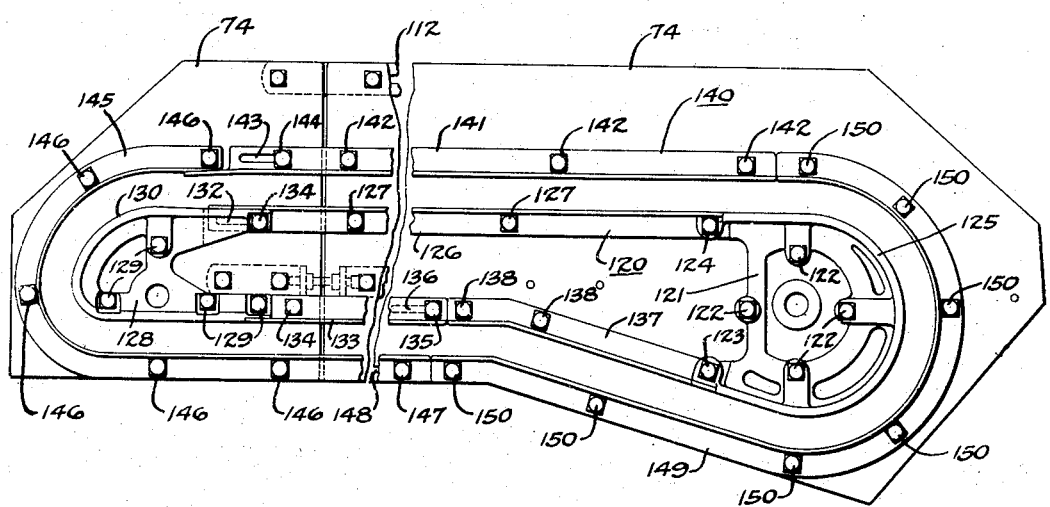
Fig. 14 is an elevation of the inside of the left side plate of the pick-up showing the track construction.

In order to adjust the chain's tension, the side plates are made in two separable parts; the lower shaft 81 is journaled in the main side plates 73, 74, and the upper shaft 80 is journaled in the auxiliary side plates 73', 74'. The apertures in plates 73', 74' for reception of bolts for fastening the plates to bars 70, 72, respectively, are slotted. A strap 110 (Fig. 4) is bolted at one end to plate 73' and is adapted to be adjustably connected to plate 73 by a bolt and slot connection 111. A strap 112 (Fig. 14) is arranged to similarly connect the plates 74, 74'. The plates are also adjustably connected together by means of an adjusting screw 113 (Fig. 4) which can also be utilized to move the plates together or apart. For this purpose, screw 113 is threaded through upstanding flanges on brackets 114, 115, secured to plates 73', 73, respectively, and lock nuts 116, 117 serve to lock the parts in adjusted position. A similar device is employed for adjusting plate 74', as shown in Fig. 14. The chains are tightened by moving plates 73', 74' away from plates 73, 74, respectively, thus moving shaft 80 away from shaft 81. When the desired tension in the chains has been obtained, the plates are secured in their adjusted positions by lock nuts 116, 117, and by securing the bolts in the slotted connections between plates 73', 74', and plates 73 and 74, respectively, and bars 70 and 72, respectively.

At regular intervals in the chain a special link 90 (Fig. 12) is used in which a pivot pin 91 is journaled. Tang bars 93 are supported on pins 91 as shown in Fig. 11 and are secured thereto by lock pin 94. Each tang bar extends transversely of the centerboard, being supported at each end on a pin 91. As shown in Fig. 13, tang bars 93 at the left are supported at one end by the pins in the chain from sprocket 83, and at the other end on the pins in the chain from sprocket 84, while the tang bars 93 at the right are supported at one end on the pin in the chain from sprocket 84 and at the other end in the pins from sprocket 85. The chains are driven in unison by rotating shaft 80 to which are keyed sprockets 83, 84, 85. Each bar is equipped with a series of tangs 95 and a strip 96 which are fastened to the bar as shown in Fig. 10. The upper portion of the strip 96 is retained in a U-shaped clamp 97 which is spaced from the tang bar 93 by a spacer 98. A screw 99 passes through the clamp 97, the strip 96, the spacer 98 and the tang bars 93 and is threaded into the last. A hook 100 is provided on spacer 98 for one end 101 of a spring 102, which is coiled around tang bar 93 and has its other end 103 projecting outwardly. Portion 103 constitutes the tang proper and serves to engage the material to be handled. By this arrangement, the tang is carried by the tang bar 93 and normally partakes of all of the movements of the tang bar, but when meeting with any obstruction is capable of yielding to prevent breakage.

The lower edge of wiper 96 contacts the surface of the centerboard 77. The tangs are moved in the direction of the arrow (Fig. 9) to convey material from the ground upwardly, and the wipers serve to prevent loss of grain kernels by brushing them up the centerboard in case they are shaken loose and drop thereon.

During the upward movement of the tangs, they are positioned substantially normal with the surface of the centerboard, as shown in Fig. 9. However, when the tangs are being swept over the ground, it is desirable that they be given an amplified sweeping movement to facilitate picking up the material. This is accomplished by imparting a rotative movement to the tang bars as they pass around the lower sprocket. For this purpose the pins 91 in the end chains, that is, the chains which are driven from sprockets 83 and 85 are integral with crank arms 92, as shown in Fig. 11. Crank arms 92 are provided with crank pins on which are rotatably mounted rollers 92'. A track is provided in each side plate in which the rollers 92' run, and the shape or path of the track controls the rotation of the tang bars by imparting the desired movement to the cranks.

The tracks are similar, and the track secured to the inner surface of the left side plate 74, shown in Fig. 14, will be described. It consists of a continuous inner rail 120, and a continuous outer rail 140. Inner rail 120 is made up of a casting 121 secured by bolts 122, 123, 124, to plate 74, and having a rail head 125 which is substantially arcuate in form but not concentric with the axis of shaft 81. The ends of the rail head 125 are straight and converging. A straight angle piece 126 is secured by bolts 127 to plate 74 and by bolt 124 to casting 121 and plate 74. Adjacent the axis of shaft 80, casting 128 is secured by bolts 129 to plate 74'.

Casting 128 is provided with a rail head 130, the central portion of which is substantially arcuate or is in substantially the form of a 90° arc about the axis of shaft 80 as its center. The ends of rail head 130 are straight and substantially parallel. Bolt 131 passes through casting 128, slot 132 in angle 126, and then through plate 74' to secure the casting rigidly to the plate and to adjustably secure the end of angle 126 to the casting and the plate. A straight angle piece 133 is secured by a bolt 134 to plate 74' and by bolts 135 which pass through slots 136 to plate 74. Angle 133 is arranged in line with the straight end of rail head 130 and substantially parallel to angle 126. Angle 137 is secured by bolts 138 to plate 74 and by bolt 123 to casting 121 and plate 74. As shown in Fig. 14, angle 137 is bent so that it has two straight portions arranged at an angle to each other, one portion being in line with angle 133 and substantially parallel to angle 126, the other portion being in line with the lower straight end of rail head 125. The outer rail 140 is arranged to form a continuous bearing surface or rail face, which is equally spaced throughout its length from the rail face of the inner track, and the rail faces of the inner and outer tracks are spaced sufficiently far apart to accommodate the rollers 92' on the tang bar cranks 92. The outer rail consists of three angle pieces. Angle piece 141 is secured by bolts 142 to plate 74 and is slotted at 143 to receive bolt 144 for adjustably fastening the angle piece to the plate 74'. Angle pieces 141 are readily removable for assembling the chains. Angle piece 145 is secured by bolts 146 to plate 74'. As pointed out before, the two lower bolts 146 pass through slots in supporting bar 72 so that plate 74' can be moved relatively thereto for adjustment. Bolt 147 passes through the lower end of angle piece 145 and through slot 148 in plate 74 to adjustably connect angle piece 145 and plate 74. Angle piece 149 is secured by bolts 150 to plate 74. The track on the other side plate is substantially identical in its construction.

Referring to Fig. 9, it appears that the track has been arranged with respect to the shafts 80, 81 and the chain 89, so that when the rollers are in position 151, 152, 153, 154, the tangs are positioned substantially normal to the chain and to the surface of the centerboard. While rounding the upper end of the track, the rollers in traveling from position 154 to position 155 cause substantially 60° clockwise (Fig. 9) movement of the tang bars relatively to the chain. The combined action of the chain and the cranks on the tang bars imparts to the tangs a resultant absolute movement which is first a pitching and dumping of the material with which the tangs are engaged, and then a withdrawal of the tangs in a direction approximately parallel with their axes. The tangs are maintained in this position as the rollers pass from position 155 to positions 156, 157. Upon arrival at position 158, the cranks, tang bars and tangs are started rotating counter-clockwise (Fig. 9). At 159 the tangs are again perpendicular to the chain. At 160 they are inclined forwardly from a position normal to the chain. At 161 they have been rotated clockwise again so that they are on the other side of the position normal to the chain. The effect of this operation is to cause the tangs to briskly sweep the ground between 159 and 160, and to gently lift the material from 160 to 161. Furthermore, in position 160 the tangs are pointed in the direction of movement of the machine so that the absolute movement of the tang, that is, with respect to the ground, is in the nature of a thrust into the material.

It is desirable that none of the material which is carried up on the conveyor be returned to the ground. It is therefore important that the material be completely disengaged from the tangs. For this purpose, a wiper 162 is provided. This wiper consists of a drum in which strips 163 of flexible material such as rubber or leather are secured. The drum is keyed to shaft 164 which is rotatably supported in bearings in brackets 165, 166 (Fig. 13). These brackets are mounted on plates 167, 168, which are adjustably secured by slotted connections with bolts 169 (Fig. 4) to supporting bars 70, 72. Secured to one end of shaft 164 (Fig. 13) is sprocket 170 which is driven by chain 171 from sprocket 172, which is secured to shaft 80. Since sprocket 170 is smaller than sprocket 172, shaft 164 will rotate more rapidly than shaft 80, and strips 163 exert a brisk wiping action on tangs 102 as they are moved from position 156 (Fig. 9) to position 157. It is for this reason that throughout the first part of the return portion of the track, the tangs are maintained in their rearwardly inclined position in order to facilitate disengagement of the material therefrom. Chain 171 is tensioned by adjusting plates 167, 168, by means of their bolt and slot connections with the supporting bars.

The inner end of shaft 80 (Fig. 13) is provided with sprocket 173 which is driven by chain 174 from sprocket 175 secured to shaft 176 (Fig. 4). Chain 174 is tensioned by means of sheave 177 pivoted on arm 178 which is angularly adjustable on its support 179 which is secured to supporting bar 72. Shaft 176 is driven from shaft 180 through reduction gear in box 181 in which shafts 176, 180, are journaled. Box 181 is secured to extension plate 182 which is attached to post 63 (Fig. 2). A sprocket 183 (Fig. 4) is secured to shaft 180 and is driven by chain 184 (Fig. 2) from sprocket 185 secured to shaft 186, which is journaled in brackets 187, 188, 189. Brackets 187 is secured to bar 39, bracket 189 is joined to bracket 188 by a U-shaped portion 190 (Figs. 1 and 2). Bracket 189 is secured to bar 40, and bracket 188 is secured to a short crossbar 191, the ends of which are secured to bars 39 and 40. Adjacent bracket 189, shaft 186 carries bevel gear 192. The inner end of shaft 186 is connected by universal joint 193 to drive shaft 11.

A draper 194 (Fig. 9) is provided for conveying the material discharged from the pick-up mechanism into the feeder house of the threshing machine. The draper is of the usual construction, and is in the form of an endless belt to which slats are attached (Fig. 6). It is supported on the framework previously described, and lengthwise it extends from a point adjacent the outer edge of the pick-up framework as defined by bar 46 to the inner end or spout which is disposed in the entrance to the feeder house and in width (Fig. 4) from the backboard 60 under the discharge end of the pick-up mechanism and under the wiper 162.

The draper at the spout end passes around a roller 195, and at the outer end passes around a roller 196 (Fig. 6). Shaft 197 of roller 195 is journaled in side plates 198 of the spout which is pivoted at 199 in crossbars 44, 45 (Fig. 1). The bottom of the spout at 200 rests on a support in the feeder house when the unit is attached to the threshing machine. When the unit is disconnected from the threshing machine, the bottom of the spout is supported from the framework at 201. The inner edges of the belt 194 are reinforced with strips of leather 202 (Fig. 9) and angles 203, 204 are attached to bars 44, 45 to guide the upper and lower stretches of the draper. For the same purpose, guides 205, 206 (Fig. 6) are attached to the side plates 198 of the spout. Sprocket 207 (Fig. 2) is secured to the end of shaft 197 and is driven by chain 208 from sprocket 209 on shaft 210 (Fig. 3). Sprocket 209 is adapted to be driven from shaft 210 by a clutch 211 which can be engaged and disengaged by means of lever 212. Shaft 210 is driven with shaft 186 by bevel gears 192, 213. To maintain the proper tension in chain 208, sheave 214 (Fig. 2) is provided. It is supported from lever 215 which is under the influence of spring 216.

The front edge of the pick-up is adjusted relative to the ground by means of bar 217 which is secured to bars 39 and 40 (Figs. 1 and 3). An operating means for bar 217 is provided on the threshing machine, not shown. Elevation of the outer end of bar 217 results in an upward swinging of the whole pick-up unit about the axis of beam 15.

As the machine is drawn over the field, the various mechanisms described are put in motion, the tangs pick up the grain and discharge it on the draper, which carries the grain into the feeder house of the threshing machine to be threshed. Due to the construction of the pick-up mechanism, the device is efficient in picking up the grain, and due to the tang action and the cooperation of the wiper, all of the grain picked up is discharged on the draper. Adjustment of the pick-up is easily obtained because the unit is designed to be substantially balanced about the axis of the beam 15.

I, therefore, claim as my invention:

1. In a pick-up unit, a framework, including forwardly extending members, forwardly and downwardly extending members, plates directly secured to both said members, and pick-up mechanism supported by said plates.

2. In a pick-up unit, a frame, a pair of plates secured to said frame, a pair of auxiliary plates secured to said frame, a pick-up mechanism supported by the plates, and means to adjust said auxiliary plates to adjust said pick-up mechanism.

3. In a pick-up unit, a frame, a pair of plates secured thereto, a pair of auxiliary plates adjustably secured to said plates and to said frame, and a pick-up mechanism supported by the plates, including a shaft supported in said auxiliary plates.

4. In a pick-up unit, a frame, a pair of main plates secured thereto, a pair of auxiliary plates adjustably secured thereto, a pick-up mechanism supported by the plates, including a pair of tracks, each supported by both a main plate and an auxiliary plate.

5. In a pick-up unit, a pick-up mechanism, supporting means therefor, comprising a pair of main plates and a pair of auxiliary plates adjustable with respect to said main plates, said pick-up mechanism including adjustable trackways supported on the plates.

6. In a pick-up unit, a pair of main plates, a pair of auxiliary plates adjustable with respect thereto, a pick-up mechanism supported on the plates, including fabricated tracks, parts of said tracks being secured to said main plates and the remaining parts of said tracks being secured to said auxiliary plates.

7. In a pick-up unit, a frame comprising upper and lower forwardly converging members, main plates secured to said upper and lower members, auxiliary plates adjustably secured to said upper members, a pick-up mechanism mounted in the plates, including an operating shaft supported in said auxiliary plates, a wiper for said pick-up, means to adjustably support said wiper on said upper frame members, and means to drive said wiper from said shaft.

8. In a pick-up unit, a frame, a pair of members mounted on said frame, a second pair of members mounted on the frame, a pick-up mechanism supported by the members, and means for mounting the members of each pair for relative adjustment to adjust said pick-up mechanism, said pick-up mechanism including adjustable trackways supported by the members.

LOWELL H. THOEN.